United States Patent [19]

Henn

[11] Patent Number: 4,584,748
[45] Date of Patent: Apr. 29, 1986

[54] LOADING BALLS THROUGH RESILIENT CAGES IN LINEAR BEARINGS

[75] Inventor: Andrew Henn, Monroe, Conn.

[73] Assignee: Incom International Inc., Pittsburgh, Pa.

[21] Appl. No.: 606,172

[22] Filed: May 2, 1984

[51] Int. Cl.[4] .......................... B21D 53/12; B21H 1/12
[52] U.S. Cl. ............................ 29/148.4 A; 29/148.4 B
[58] Field of Search .................... 29/148.4 A, 148.4 C, 29/148.4 R, 149.5 R, 724, 725; 308/6 C, 537

[56] References Cited

U.S. PATENT DOCUMENTS

| | | |
|---|---|---|
| 3,079,678 | 3/1963 | Aller et al. ............... 29/148.4 A X |
| 3,103,059 | 9/1963 | Rozentals ....................... 29/724 X |
| 3,590,459 | 7/1971 | Katz ................................. 29/724 |
| 3,842,472 | 10/1974 | Rottacker et al. ............ 29/724 X |
| 4,278,305 | 7/1981 | Olschewski et al. ............ 308/6 C |

*Primary Examiner*—Howard N. Goldberg
*Assistant Examiner*—Steven Nichols
*Attorney, Agent, or Firm*—James C. Wray

[57] ABSTRACT

Balls are loaded into ball recirculating grooves of linear bearings by snapping balls past resiliently deformable edges of slots in the linear bearings. The edges are lips on ball exposing slots adjacent races in linear bearings.

13 Claims, 7 Drawing Figures

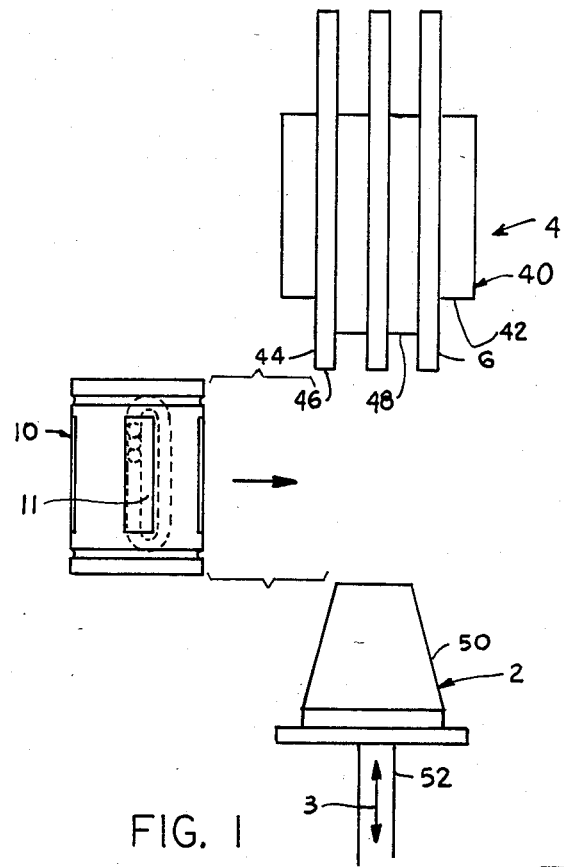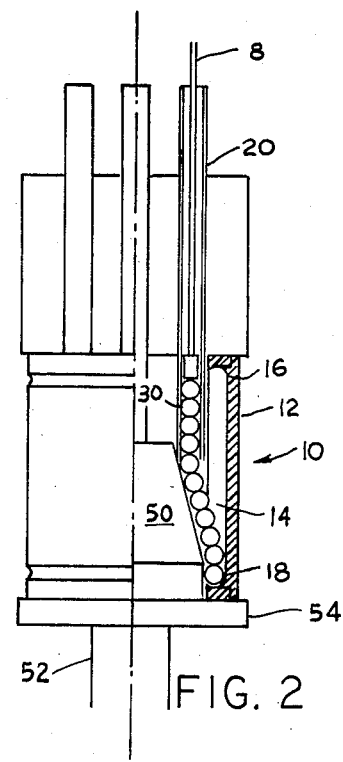
FIG. 1
FIG. 2

LOADING BALLS THROUGH RESILIENT CAGES IN LINEAR BEARINGS

Linear bearings having recirculating balls are well known mechanical devices in which balls move along axial tracks in contact with a race in the bearing shell while extending through a slot in the bearing cage to engage a guide rod. Usually, the bearings and the guide rods along which they move are cylindrical. Any complementary, uniform cross sections may be used. Generally, portions of the balls are exposed inwardly through slots in the cages to contact exterior surfaces of cylindrical guide rods.

Conventional bearings have multiple parts, a shell, a race, which is mounted on the shell and which is conventionally integrally formed with the shell, a cage, which is axially inserted in the shell, balls, which substantially fill recirculating, complementary guideways formed in the shell and in the cage, and retainers for retaining the cages within the shells.

In conventional bearings, a retainer is positioned at one end of the shell, a cage is substantially inserted in the shell, and balls are inserted in exposed portions of guideways in an end of the cage which partially extends from the shell. The cage is then completely inserted in the shell, and a second retainer is added to hold the cage within the shell.

To reduce weight and expense of linear bearings, cages and shells have been constructed of plastic material, and races have been connected to the plastic shells, such as by snapping the races into race receiving openings from an outside of the shell. The cage is fixed in the shell, such as by bonding, balls are inserted into the guideways through the race receiving openings, and the races are subsequently snapped into the openings, closing the shell and entrapping the balls.

The loading of the balls may require sequential other than simultaneous loading of guideways, requiring many successive turning and loading steps. Turning and loading require excessive time and multiple mechanisms, which add to the expense of the bearings. Moreover, it may be difficult to control precisely the numbers of balls loaded in the guideways.

In all prior art cases, the elements of the bearings are only partially assembled before loading of the balls, followed by a completion of assembly of the bearing elements. The multiple step assembly requires expensive assembly tools, complex movements and additional time and expense, which result in a relatively high cost of assembling the bearings.

A need exists for a ball loading method which may avoid complex assembly steps and enable complete assembly of elements before balls are loaded.

The present invention uniquely provides a loading method in which balls are loaded after other elements of the linear bearing are fully assembled.

A linear motion, anti-friction bearing has a hollow, plastic shell, a hollow, plastic ball retaining cage inserted therein, and metal races in four axially extending slots through the surface of the shell. Balls are inserted into each of four interior slots by placing a tapered, solid object into one axial end of the bearing assembly and placing tubes having plunger extruding means and loaded with a predetermined number of balls into the opposite axial end. The tubes are aligned with interior slots and abut the tapered object. When the plungers expel the balls, they are forced to snap into the interior slots of the bearing assembly.

A preferred method of loading balls through resilient cages of linear bearings comprises pressing balls from one side of the cages through ball retaining slots into ball retaining grooves in the cages.

The preferred method further comprises resiliently deforming edges of slots while pressing balls through the slots and resiliently relocating edges of slots after balls are pressed through the slots, thereby recapturing balls beyond the slots in the grooves.

In the preferred method, balls move along grooves in the cages following the pressing of the balls through the slots to fully load the grooves with balls.

Preferably, balls are generally radially pressed through generally axial slots of annular bearing cages. Preferably, the balls are moved longitudinally along the slots while radially pressing the balls through the slots. The preferred method of loading balls includes generally axially pressing on the balls while moving the balls axially through the slots.

The preferred method forces the balls longitudinally against a conical surface which redirects the balls in a generally radial direction.

In the preferred method of loading, balls are initially aligned in a tube, having a delivery opening adjacent the slot through which the balls are loaded and adjacent the conical surface. The balls contact the slot and align with the slot upon release from the delivery opening of the tube.

The preferred method further initially loads into the tube a predetermined number of balls sufficient to fill a continuous ball guiding groove in the cage of a linear bearing.

The preferred method simultaneously feeds balls through plural tubes onto the conical surface and simultaneously presses balls through plural slots with the conical surface.

The preferred method of loading balls includes the steps of aligning a linear bearing and cage axially with a conical surface and with plural tubes for delivering balls to the conical surface, moving the conical surface and the tubes relatively toward each other with the linear bearing and cage therebetween, forcing balls through the tubes and pressing balls through the slots.

The preferred method of loading balls in linear bearings having resilient cages comprises axially aligning linear bearings and ball inserting means, moving the inserting means and the linear bearings axially toward each other and forcing balls through the inserting means and through slots in cages of the linear bearings into ball guiding grooves in the linear bearings.

A preferred apparatus for loading balls through resilient slots in linear bearings includes ball guiding means for guiding balls to the slots and ball forcing means connected to the ball guiding means for forcing balls through the ball guiding means and redirecting means for positioning adjacent the slots and adjacent the guiding means for redirecting balls through the resilient slots.

Preferably, the ball guiding means is a tube having a delivery opening adjacent the slot. The ball forcing means is a plunger mounted in the tube for forcing balls through the tube. The redirecting means is a surface aligned at an angle to the tube and to the slot for redirecting the balls from the delivery opening of the tube into the slot.

Preferably, the ball guiding means has plural tubes respectively aligned with plural slots in the linear bearing.

A preferred embodiment has means for predetermining numbers of balls in the guiding means to be loaded through the slots into the linear bearings.

These and further and other objects and features of the invention are apparent in the disclosure which includes the above and ongoing specification with the appended claims and the drawings.

BRIEF DESCRIPTION OF THE DRAWINGS

FIG. 1 is a schematic description of a preferred assembly apparatus and method.

FIG. 2 is a schematic detail, partially in section, showing a preferred method and apparatus for loading balls through bearing guiding slots in cages of linear bearings.

DETAILED DESCRIPTION OF THE DRAWINGS

Figure 3:
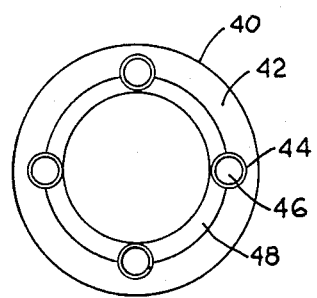
FIG. 3 is a bottom view of the ball guiding tubes shown in FIG. 1.

FIG. 1 generally indicates parts of a preferred assembly device and steps of a preferred assembly method. A linear bearing 10 with metal races 11 in a plastic shell 12 and a cage previously assembled inside the shell 12 is moved in the direction of arrow 13 into an assembly station generally indicated by the numeral 1. The assembly station has cooperating tools 2 and 4. When the bearing 10 is axially aligned with the tools, tool 2 moves upward in the axial direction of arrow 3.

In a preferred embodiment, tool 4 remains stationary. Tool 2 engages the bottom of bearing 10 and lifts the bearing into engagement with tool 4. Alternatively, tool 4 may reciprocate in complementary, axial directions with tool 2. Tool 4 contains plural tubes 6, each having plungers 8 which force the balls out of the tube against tool 2 and into the slot in the bearing cage.

Alternatively, the tubular guiding means 6 may be formed with an angled or sloping surface at its lower end so that the redirecting means is incorporated within the guiding means to press the balls through the slots in the bearing cages. The forcing means 8 is a plunger which may extend completely through the guiding means to force balls through the guiding means and against the redirecting means and thereby to push the balls through the slots in the cages.

Preferably, the length of the guiding tube 6 is chosen so that a full tube will contain sufficient balls to completely fill the entire recirculating track or guiding groove. Tubes may be topped with funnels which may direct a previously counted number of balls into each tube, or the tubes may be topped with funnels with the plunger acting as a gate to open the tube to permit filling through the upper end of the tube and then closing the tube as an initial step of its forcing action to prevent additional flow of balls into the tube and, thus, to predetermine the number of balls to be forced into each recirculating guideway of the bearings.

Alternatively, the tubes may be filled with an excessive number of balls, and the balls may be forced into the guideways until no further balls fit within the guideways. The particular sizing of the balls and the guideways in that embodiment assures the necessary freedom of the balls and may leave a space in the guideways which is slightly less than that necessary to receive one additional ball.

In an alternate preferred form of the invention, the redirecting means may block a lower end of the bearing, and balls may be directly inserted into the bearing which, with the redirecting means, forms the guide means, and the forcing means may be formed complementarily with the guiding means to force the balls through the slots.

As a further embodiment of the invention, the redirecting means may be enlarged or deformed mechanically or hydraulically to press the balls through the resilient slots, or the redirecting means may have a nonuniform surface which, when turned, forces the balls through the slot, the redirecting means thus becoming a forcing means.

In the preferred embodiment shown in FIGS. 1, 2 and 3, lower ends 44 of tubes are inserted within the bearings opposite the slots. In FIG. 3, four tubes are shown. Any number of tubes, for example, six or eight tubes, may be provided in keeping with the number of slots, guideways and races in the linear bearing.

In FIG. 2, the linear bearing is schematically shown and is generally indicated by the numeral 10. The shell 2 and cage 20 together form a recirculating groove, track or guideway 14 in a well known manner. As is well known, the curved portions 16 and 18 of the track allow the balls to move from the nonactive portion of the track to an active portion of the track in which balls partially extend through slot 24.

To insert the balls in the track, lower portions 44 of tubes 6 are positioned within the bearing and are aligned with the slots 24. Delivery ends 46 are positioned adjacent the sloping wall on tool 2 and adjacent the slots 24. After the juxtapositioning of the parts, a predetermined number of balls 30 is loaded into the tube, and the balls 30 flow from the delivery end 46 of the tube and engage the slot. As plunger 8 is lowered, balls are forced out of the lower end of the tube against the sloping surface of tool 2 and through the resilient edges 22 of the slot 24.

While the balls may be inserted in any position along the slot, one preferred location for inserting the balls through the slot is opposite the race. Another preferred location is at the end of the race in the curved area shown by numbers 16 and 18.

As shown in FIGS. 1 and 3, the tubes 6 are mounted in a support 40 with a lower edge which abuts an upper end of the bearing when the tools are moved toward each other. A ring 48 may extend into the bearing to support the lower ends of the tubes.

The frustoconical wall 50 of tool 2 may engage the lower inner edge of the cage 20 when tool 2 is moved by stem 52. Alternatively, as shown in FIG. 2, a collar 54 is formed around tool 2 to engage the entire lower end of the bearing.

Figure 5:
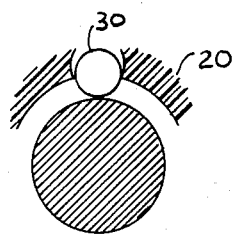
Figure 6:
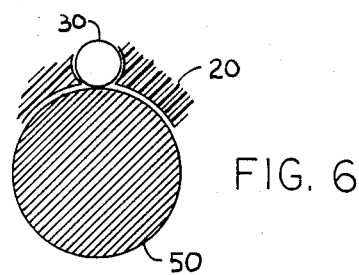

As shown in FIGS. 4-7, the balls 30 are passed by the edges 22 of the slots 24, resiliently deforming the edges shown in FIG. 5, which then return to recapture the ball 30 as shown in FIG. 6.

Figure 7:
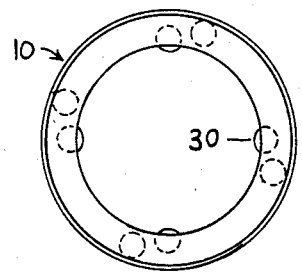
FIG. 7 is a schematic end view of a linear bearing showing partially exposed balls.
Figure 4:
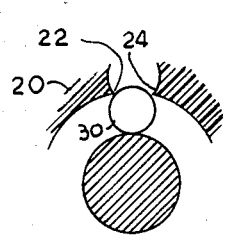
FIGS. 4, 5 and 6 are sequential schematic details of balls being snapped through resilient edges of a slot in a linear bearing cage.

FIG. 7 shows an end view of a bearing in which the balls 30 partially extend from the slots in the cage.

While the invention has been described with reference to specific embodiments, modifications and variations of the invention may be made without departing from the scope of the invention. The scope of the invention is defined in the following claims:

I claim:

1. The method of loading balls through resilient cages of linear bearings, comprising the steps of:
   (A) positioning plural tube ends adjacent plural slots, said slots having deformable resilient edges behind which is located grooves for balls; and
   (B) positioning a conical surface adjacent said tubes, whereby said tube ends are located between the slots and the conical surface; and
   (C) feeding balls through the plural tubes, whereby said balls move through the tubes and out the ends to roll between the conical surface and the slots; and
   (D) simultaneously pressing the balls through the tubes, whereby the balls roll along the conical surface and the slots to a point where the surface and slots meet whereupon the resilient edges deform and the balls enter the grooves.

2. The method of loading balls as set forth in claim 1 further comprising generally radially pressing balls through generally axial slots of annular bearing cages.

3. The method of loading balls as set forth in claim 2 wherein the generally radially pressing the balls through the slots comprises moving the balls longitudinally along the slots while radially pressing the balls through the slots.

4. The method of loading balls as set forth in claim 3 further comprising generally axially pressing on balls before axially moving the balls through the slots.

5. The method of loading balls as set forth in claim 4 further comprising forcing the balls longitudinally against a conical surface and redirecting the balls in a generally radial direction with the conical surface.

6. The method of loading balls as set forth in claim 5 further comprising initially aligning plural balls in a tube having a delivery opening adjacent the slot through which the balls are loaded and adjacent the conical surface.

7. The method of loading balls as set forth in claim 6 further comprising contacting the balls with the slot and aligning the balls with the slot upon releasing the balls from the delivery opening of the tube.

8. The method of loading balls as set forth in claim 6 further initially loading into the tube a predetermined number of balls sufficient to fill a continuous ball guiding groove in the cage of a linear bearing.

9. The method of loading balls as set forth in claim 6 further comprising aligning the tube generally axially along the slot.

10. The method of loading balls as set forth in claim 8 further comprising the steps of aligning a linear bearing and cage axially with the conical surface and with plural tubes for delivering balls to the conical surface, moving the conical surface and the tubes relatively toward each other with the linear bearing and cage therebetween before forcing balls through the tubes and pressing balls through the slots.

11. The method of loading balls in linear bearings having resilient cages comprising axially aligning linear bearings and plural ball inserting means, moving the inserting means and the linear bearings axially toward each other and forcing balls against a surface sloped with respect to an axial direction and forcing balls from that surface through the slots in cages of the linear bearings.

12. Apparatus for loading balls through resilient slots in linear bearings comprising ball guiding means for guiding balls to the slots, wherein said ball guiding means comprises plural tubes having delivery openings adjacent the slots, ball forcing means connected to the ball guiding means for forcing balls through the ball guiding means, wherein the ball forcing means comprises plungers mounted in the tubes, and redirecting means adjacent the slots and adjacent the guiding means for redirecting balls through the resilient slot, wherein the redirecting means comprises a surface aligned at an angle to the tubes and to the slots for redirecting the balls from the delivery openings of the tubes into the slots.

13. The apparatus of claim 12 further comprising means for predetermining numbers of balls in the guiding means to be loaded through the slots into the linear bearings.

* * * * *